(No Model.) 2 Sheets—Sheet 1.

J. BROWN.
APPARATUS FOR CLIMBING CHIMNEYS, &c.

No. 350,289. Patented Oct. 5, 1886.

WITNESSES
Jas. Lenox Banks
Chas. b. Bull

INVENTOR
James Brown
by Bradhou & Bull
Attys.

(No Model.) 2 Sheets—Sheet 2.

J. BROWN.
APPARATUS FOR CLIMBING CHIMNEYS, &c.

No. 350,289. Patented Oct. 5, 1886.

WITNESSES
Jas. Lenow Banks
Chas. Bull

INVENTOR
James Brown
by Broadnax Bell
Atty.

UNITED STATES PATENT OFFICE.

JAMES BROWN, OF LIVERPOOL, COUNTY OF LANCASTER, ASSIGNOR OF TWO-THIRDS TO THOMAS ANDREW PORTER, OF BOOTLE, AND JOHN HOWARD, OF LIVERPOOL, ENGLAND.

APPARATUS FOR CLIMBING CHIMNEYS, &c.

SPECIFICATION forming part of Letters Patent No. 350,289, dated October 5, 1886.

Application filed March 23, 1886. Serial No. 196,232. (No model.) Patented in England March 17, 1885, No. 3,435; in France July 7, 1885, No. 169,997, and in Belgium July 8, 1885, No. 69,535.

*To all whom it may concern:*

Be it known that I, JAMES BROWN, a subject of the Queen of Great Britain, and a resident of the city of Liverpool, in the county of Lancaster, in that part of the United Kingdom of Great Britain and Ireland called England, engineer, have invented an Improved Apparatus for Climbing Chimneys and like Erections, (for which I have obtained a patent in Great Britain, numbered 3,435, dated March 17, 1885; in France, numbered 169,997, dated July 7, 1885, and in Belgium, No. 69,535, dated July 8, 1885;) and I do hereby declare that the following is a description of my invention in sufficiently clear terms as to enable any skilled person to make and use the same, reference being had to the accompanying two sheets of drawings, which make a part of this specification, and to the letters and figures of reference marked thereon, like letters and figures being used to denote the same or corresponding parts throughout the drawings.

My invention has for its object an improved apparatus for climbing chimneys and like erections, whereby such chimneys or like erections can be mounted from the outside, the apparatus being worked to mount and also to descend the chimney or other like erection in stages, and being used for building, repairing, and other purposes.

I attain the objects of my invention by the mechanism illustrated in the accompanying drawings, in which—

Figure 2:
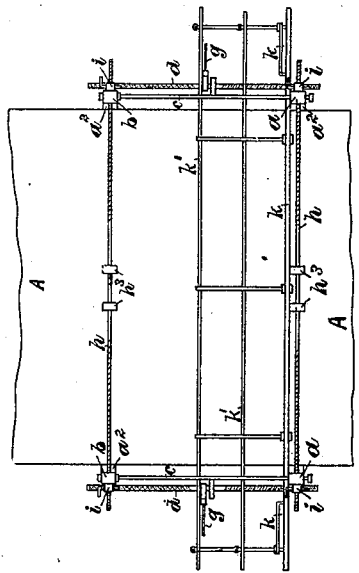
Figure 4:
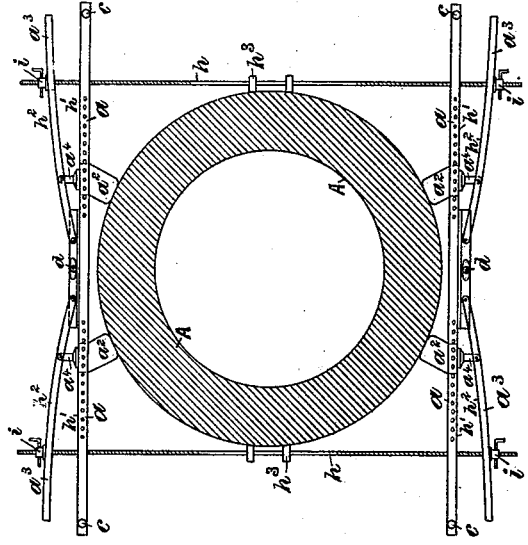
Figure 1:
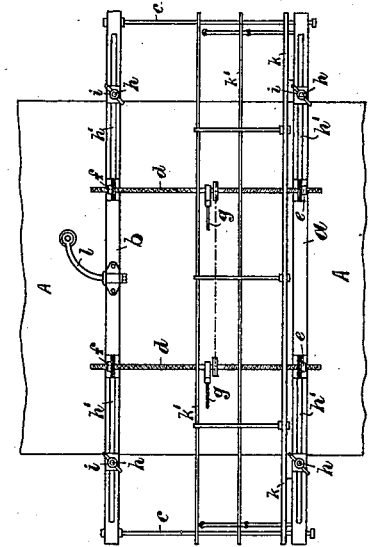
Figure 3:
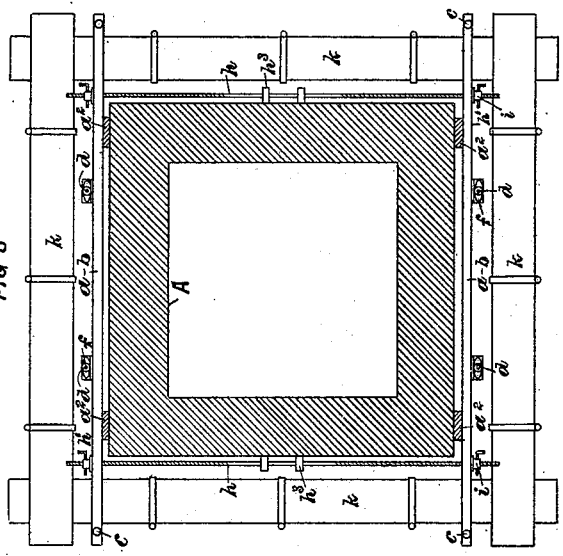
Figure 5:
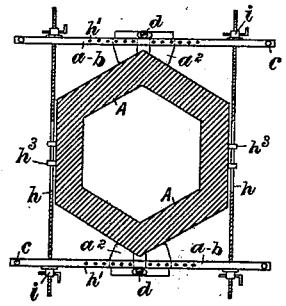
Figure 6:
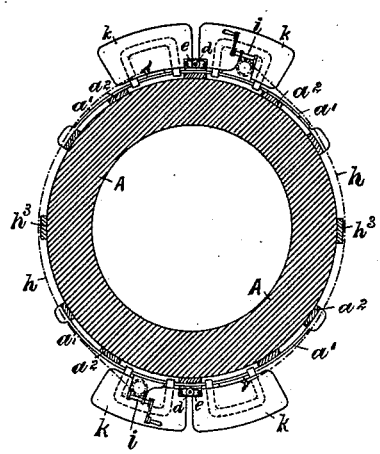
Figure 8:
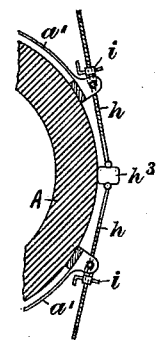
Figure 9:
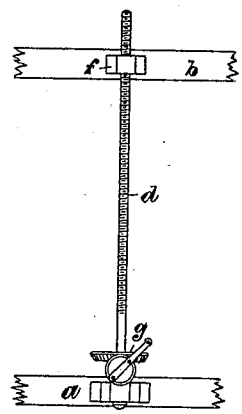
Figure 7:
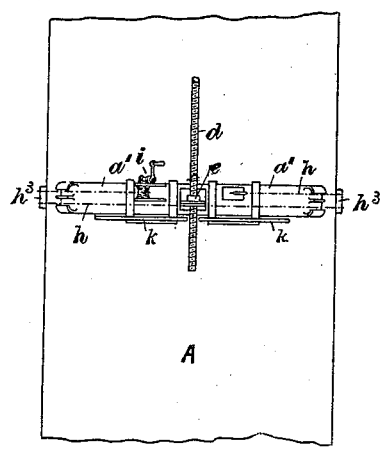
Figure 10:
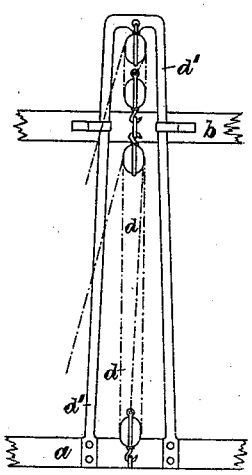

Figure 1 is a side elevation of an apparatus according to my invention shown applied to a chimney, only a portion of the chimney being shown for convenience of space. Fig. 2 is a side view of Fig. 1. Fig. 3 is a plan of Fig. 1, showing the apparatus applied to a chimney of square section. Fig. 4 is a plan of a round chimney, showing the application of an apparatus when applied thereto. This arrangement is also suitable for octagon or like polysided chimneys. Fig. 5 is a plan, being a modification of the apparatus shown at Fig. 4 as applied to a six-sided chimney. Fig. 6 is a plan showing another modification of my invention as applied to a round chimney. Fig. 7 is a side elevation of Fig. 6. Fig. 8 is a plan showing a modification of detail of the apparatus shown at Fig. 6. Fig. 9 is a detail of the raising and lowering gear of the apparatus. Fig. 10 shows a modification of Fig. 9.

The apparatus, according to my invention, for climbing chimneys and like erections consists of two clamping devices positioned one above the other and made to suit any form or section of chimney or other like erection, and capable of being cramped and raised or lowered, so as to mount and also to descend the chimney or other like erection in stages.

The apparatus consists of two clamping devices, $a$ and $b$, the clamping device $b$ being positioned over and some distance above the clamping device $a$. The clamping device $a$ is connected to the clamping device $b$ by the four sliding rods $c$. On each side, between and connecting the clamping devices $a$ and $b$, there are provided two rods, $d$, which may be made with right and left hand screw-threads, which respectively take into the screw-nuts or blocks $e$ on the clamping device $a$ and the screw-nuts or blocks $f$ on the clamping device $b$. Each of these screw-rods $d$ is provided with a ratchet-wheel and a handle or other turning device, $g$, whereby the screw-rods $d$ can be turned and the clamping devices $a$ and $b$ can be brought together or separated, as shown at Figs. 1 and 2 of the drawings; or, instead of so constructing the rods $d$, they can be constructed as shown at Fig. 9—namely, with a screw-thread working into the nut $f$ on the clamping device $b$, the rod $d$ being turned by a bevel-wheel and pinion-gear, $g$, as shown; or the raising and lowering device may consist, as shown at Fig. 10—namely, of a forked guide, $d'$, fixed to the clamping device $a$, and free to slide in the clamping device $b$, the separating and bringing together of the clamping devices $a$ and $b$ being in this case effected by the blocks and tackle $d$.

The clamping devices $a$ and $b$ each consist of two pieces or bars of wood or metal, $a\,a$ and $b\,b$, provided with blocks $a^2$, (see Figs. 3, 4, 5, and 6,) which bear against the sides of the chimney or other structure, A, to be mounted or descended. These bars $a\,a$ and $b\,b$, with their blocks $a^2$, are caused to bear and bind on the surface of the structure A by means of screw-rods $h$, as shown at Figs. 3, 4, 5, and 8, or by cords or chains $h$, as shown at Figs. 6 and 7, there being a screw-rod, $h$, or a rope or chain, $h$, on each side of each clamping device. Each end of the screw-rods $h$ is provided with a screw-nut, $i$, and with a turning handle, whereby, through the screw-rods $h$, the side pieces, $a'$, of the clamp can be brought together and made to bind on the surface of the structure A. Each of the clamps $a$ and $b$ is similarly constructed, and their side pieces are provided with slots $h'$, with slide-blocks through which the ends of the screw-rods $h$ work, so that the screw-rods $h$ can be always kept up close to the surface of the structure. There are also provided on the rods $h$ rollers or blocks $h^3$, which steady the rods $h$ by bearing against the structure A. The clamping device $a$ is provided with a platform, $k$, fitted with a rail-guard, $k'$. This platform or staging $k$ is used for carrying workmen and materials in working on the structure A, and the platform $k$ is constructed in four pieces, so that it can be brought close to the sides of the structure as the sectional area of the structure diminishes or increases. There is also provided a davit, $l$, for raising articles.

When the apparatus is applied to round, octagon, six-sided, or similar chimneys or erections, the side pieces of the clamping devices $a$ and $b$ are preferably made of channel-iron, and the blocks $a^2$ are made to suit the surface of the structure A, and to be adjustable in the slots $h'$ of the side pieces, as shown at Figs. 4 and 5. There may also be provided levers $a^3$, with slots at $h^2$, in which the screw-rods $h$ work, adjustable blocks $a^4$ being provided, which press the blocks $a^2$ against the structure A. This lever arrangement is shown in Fig. 4; in Fig. 5 it is omitted.

Instead of using rigid side pieces for the clamps $a$ and $b$, they may, in the case of round chimneys, be made of flexible bands, as shown at Figs. 6, 7, and 8, provided with blocks $a^2$. These flexible bands are brought together or separated by the chains or cords $h$, as shown in Fig. 6, or by the screw-rods $h$, as shown in Fig. 8. The upper and lower clamps, $a$ and $b$, are each of the same construction, and they are brought together or separated vertically by the screw-rods $d$, as before described. The platforms $k$ are hung on to the clamping device $a$, as shown at Figs. 6 and 7.

In Fig. 10 a rigid standard, $d'$, is attached to one of the clamping-frames, and by a system of pulleys the frames are caused alternately to approach and recede from each other. This device, in combination with the pulleys, is a mere substitute for and performs the same functions as the screw-rod $d$, the substantial feature being the rigid connecting support between the two clamping devices, by means of which the upper clamping device is raised or lowered by power controlled and operated from the lower clamp acting as a standard.

The operation of an apparatus according to my invention is as follows: Presume the apparatus to be at the bottom of and surrounding a chimney-shaft, and it is desired to climb the chimney by the apparatus, the clamping devices $a$ and $b$ are first separated to their fullest extent by turning the screw-rods $d$ by means of the handles $g$. The upper clamping device, $b$, is then made to cramp and bind firmly against the surface of the chimney by means of the screw-rods $h$ and the tightening-nuts $i$. When this has been done, the lower clamping device, $a$, is raised by means of the screw-rods $d$ until it comes close up to the upper clamping device, $b$, (the guide-rods $c$ passing through the clamping device $a$). When it has attained this position, the clamping device $a$ is made to cramp and bind firmly onto the surface of the chimney by means of its screw-rods $h$. The upper clamping device, $b$, is then slackened, and by again turning the screw-rods $d$ (but in the reverse direction) it is raised to its fullest extent from the clamp $a$, when it is again cramped and bound onto the chimney-surface, and the operation is repeated in the manner just described. By this means the chimney is ascended in stages and descended by the same means.

It will of course be understood that I do not mean to limit my patent to the precise devices and combinations of devices described and illustrated herein. I have described such devices and methods of applying them as I prefer to employ, and I understand that any merely formal change will be included in this description and the concluding claims; and I am also aware that claims for methods and means employed in ascending will cover substantially the same methods and means employed in descending.

Having now described my invention and in what manner the same is to be performed, I claim—

1. The combination, in a chimney-climbing apparatus, of a clamping device, $a$, with a clamping device, $b$, having adjusting-screws $d$, and a platform, $k$, substantially as set forth.

2. In a clamping device for climbing chimneys, the combination of the side pieces, $a$, screw-rods $h$, screw-nuts $i$, blocks $a^2$, blocks $a^4$, and levers $a^3$, all substantially as set forth, for the purposes specified.

3. In a climbing apparatus, the combination of an upper clamping device, $b$, and a lower clamping device, $a$, operated by clamping-screws $h$, and extension and contraction screws $d$, substantially as set forth.

4. In a chimney-climbing apparatus, the combination of a plurality of clamping devices, and means, substantially as described, for causing the same alternately to approach and recede from each other with a progressive motion, for the purpose specified.

5. In a chimney-climbing apparatus, a plurality of clamping devices, and a rigid standard, combined with means for causing said clamping devices to alternately approach and recede from each other with a progressive motion, substantially as described.

6. In a chimney-climbing apparatus, the combination, in a clamping device employed therein, of adjustable bearing-blocks and side bars to which they are attached, substantially as described.

7. In a chimney-climbing apparatus, the combination of bearing-blocks, levers pivoted thereto, a frame to which said levers are attached, and means of applying power to the long ends of said levers to cause the bearing-blocks to hug the chimney, substantially as described.

JAMES BROWN.

Witnesses:
 FREDERICK JOHN CHEESBROUGH,
 JOHN HAMILTON REDMOND,
 *Both of 15 Water Street, Liverpool, England.*